(12) United States Patent
Yang et al.

(10) Patent No.: US 8,832,287 B2
(45) Date of Patent: Sep. 9, 2014

(54) CONTROL METHOD, AUTHENTICATING METHOD FOR ELECTRONIC DEVICE AND STREAMING MEDIA SERVER

(75) Inventors: Jian Yang, Shenzhen (CN); Guoqiao Chen, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 1116 days.

(21) Appl. No.: 12/413,939

(22) Filed: Mar. 30, 2009

(65) Prior Publication Data

US 2009/0185040 A1    Jul. 23, 2009

Related U.S. Application Data

(63) Continuation of application No. PCT/CN2007/070844, filed on Sep. 30, 2007.

(30) Foreign Application Priority Data

Sep. 30, 2006 (CN) .......................... 2006 1 0159670

(51) Int. Cl.
  *G06F 15/16* (2006.01)
  *H04L 29/06* (2006.01)
(52) U.S. Cl.
  CPC .......... *H04L 65/4092* (2013.01); *H04L 63/08* (2013.01)
  USPC ....................................................... 709/229
(58) Field of Classification Search
  None
  See application file for complete search history.

(56) References Cited

U.S. PATENT DOCUMENTS 6,353,848 B1 * 3/2002 Morris .......................... 709/203
6,608,832 B2 * 8/2003 Forslow ........................ 370/353

(Continued)

FOREIGN PATENT DOCUMENTS

CN    101317413 B    6/2002
CN    1558611    12/2004

(Continued)

OTHER PUBLICATIONS

Schulzrinne, H., et al., "Real Time Streaming Protocol (RTSP)," Network Working Group, Internet Engineering Task Force, Apr. 1, 1998, pp. 1-94.

(Continued)

*Primary Examiner* — Backhean Tiv
(74) *Attorney, Agent, or Firm* — Conley Rose, P.C.; Grant Rodolph; Nicholas K. Beaulieu (57) ABSTRACT

The present invention provides a method for controlling an electronic device and an authentication method for controlled electronic device resources; the method for controlling an electronic device includes the following steps: receiving the electronic device control information from the client, by the streaming media server, wherein, the electronic device control information is included in the initial line, header field, message body in the network control protocol, or an combo including the initial line, header field, and message body; parsing out the electronic device control information from the initial line, header field, message body, or the combo including any combination of the initial line, header field, and message body, by the streaming media server; controlling the electronic device according to the control information. The streaming media server includes a receiving unit, a parsing unit, and a control unit, or it includes a receiving unit, a parsing unit, and an authenticating unit. The present invention enables the user to carry out at least either of control or authentication for the electronic device from a client.

3 Claims, 5 Drawing Sheets

(56) References Cited

U.S. PATENT DOCUMENTS

| | | | |
|---|---|---|---|
| 6,698,021 B1* | 2/2004 | Amini et al. | 725/105 |
| 6,954,859 B1* | 10/2005 | Simerly et al. | 726/3 |
| 7,131,132 B1* | 10/2006 | Gehlot et al. | 725/10 |
| 7,199,817 B2* | 4/2007 | Mottur et al. | 348/142 |
| 7,554,570 B2* | 6/2009 | Benco et al. | 348/14.01 |
| 7,573,862 B2* | 8/2009 | Chambers et al. | 370/349 |
| 7,668,109 B2* | 2/2010 | Veres et al. | 370/252 |
| 7,826,353 B2* | 11/2010 | Honkasalo et al. | 370/230 |
| 8,004,561 B2* | 8/2011 | Mottur et al. | 348/143 |
| 8,169,409 B2* | 5/2012 | Castagnet | 345/171 |
| 2002/0131773 A1* | 9/2002 | Bigler | 396/58 |
| 2003/0093430 A1* | 5/2003 | Mottur | 707/10 |
| 2003/0108015 A1* | 6/2003 | Li | 370/338 |
| 2003/0217174 A1* | 11/2003 | Dorenbosch et al. | 709/237 |
| 2006/0181612 A1 | 8/2006 | Lee et al. | |
| 2007/0025301 A1* | 2/2007 | Petersson et al. | 370/338 |
| 2009/0059945 A1* | 3/2009 | Yokomitsu et al. | 370/419 |
| 2009/0077601 A1* | 3/2009 | Brailean et al. | 725/109 |
| 2009/0185040 A1* | 7/2009 | Yang et al. | 348/207.11 |
| 2010/0325741 A1 | 12/2010 | Little et al. | |

FOREIGN PATENT DOCUMENTS

| | | |
|---|---|---|
| CN | 1748191 A | 3/2006 |
| JP | 2001-320437 A | 11/2001 |
| KR | 20050025872 | 3/2005 |
| WO | 99/48276 A1 | 9/1999 |
| WO | 2005/013607 A1 | 2/2005 |

OTHER PUBLICATIONS

First Chinese Office Action dated (mailed) Nov. 29, 2010, issued in related Chinese Application No. 200780000315.4 Huawei Technologies Co., Ltd.

Written Opinion of the International Searching Authority (translation) dated (mailed) Jan. 10, 2008, issued in related Application No. PCT/CN2007/070844, filed Sep. 30, 2007, Huawei Technologies Co., Ltd.

* cited by examiner

CONTROL METHOD, AUTHENTICATING METHOD FOR ELECTRONIC DEVICE AND STREAMING MEDIA SERVER

CROSS-REFERENCE TO RELATED APPLICATIONS

The present application is a continuation of International Application No. PCT/CN2007/070844, filed on Sep. 30, 2007, which claims the benefit of Chinese Patent Application No. 200610159670.3, filed on Sep. 30, 2006, both of which are hereby incorporated by reference in their entireties.

FIELD OF THE INVENTION

The present invention relates to control field, particularly to a control method, an authentication method for an electronic device, and a streaming media server.

BACKGROUND OF THE INVENTION

Cameras are usually used in monitoring systems, such as anti-theft monitoring systems and home security electronic eye systems. A camera used in a conventional monitoring system usually includes a base, a camera and a power system mounted thereon. The power system is directly connected to a control console through a data line. The control console controls the power system with dedicated signaling, and thereby controls the movement of the camera and the assistant equipment.

The conventional technical scheme for controlling the movement of the camera and the assistant equipment causes the following technical problems: 1. The camera control method is professional, thus requires heavy investment; 2. Though streaming media techniques are widely used today, the camera control method is not compatible with popular streaming media systems because it employs dedicated signaling control; 3. The camera may only be controlled by the control console; as a result, the user has to operate in front of the control console, which is inconvenient.

In addition, the existing camera control technique is on individual user basis, and thus the user is not required to input the user name and password. However, cameras are a rare resource, and reuse of the camera resource is not supported in the existing technique.

Reuse of resources is very popular today, for example, for streaming media network resources, the user management method of which employs an authentication process to enable different users to access the resources. Specifically, different access rights are set for different user levels, such as low-level, middle-level, and high-level access rights. Suppose a high-level user attempts to access the system when a middle-level user is using the system, the system will judge the access rights of these users; if the system finds a lower-level user is occupying the system resources and a higher-level user requests to access the system resources, the system will release the resources occupied by the lower-level user automatically and provide the resources to the higher-level user.

Figure 1:
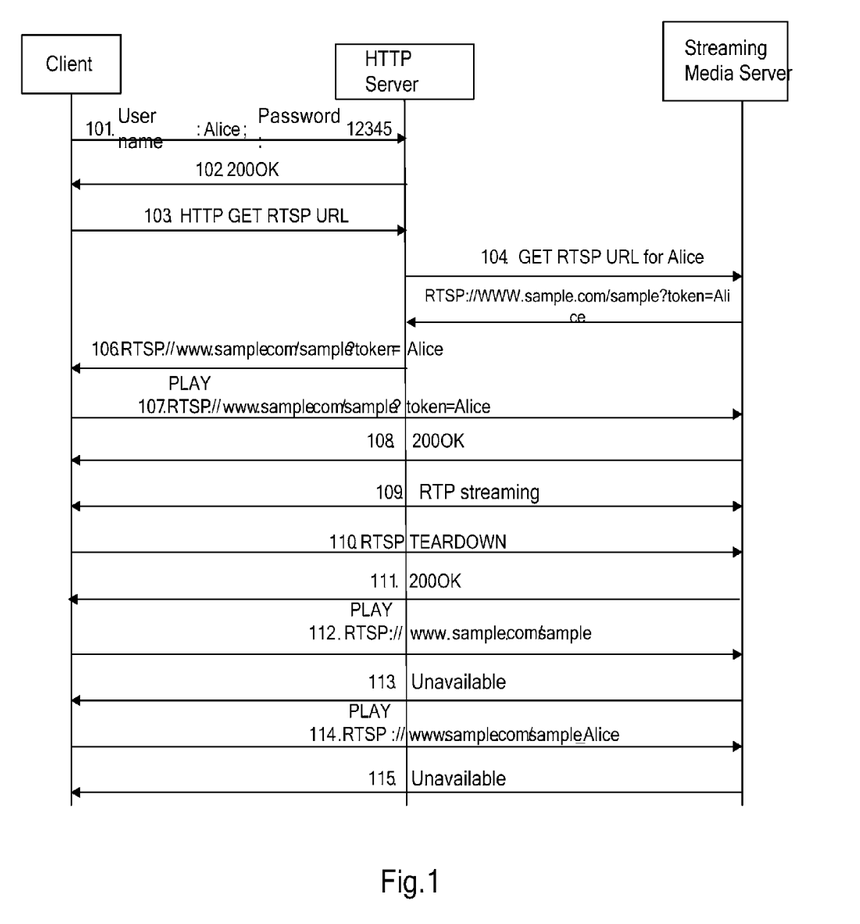
FIG. 1 shows a timing sequence diagram of a streaming media authentication method in the prior art.

FIG. 1 shows a time sequence diagram of authentication for streaming media in the prior art. The existing streaming media resource authentication technique is to deploy a Hypertext Transfer Protocol (HTTP) server between the clients and the streaming media server, and make comparison of user name and password in HTTP, so as to identify a user. And, on that basis, the Uniform Resource Identifier (URI) of the requested streaming media resource is sent to the streaming media playback platform, which will send a playback request on the basis of the URI. The streaming media platform will judge validity of the URI, and provide the corresponding media content to the requester. The requester will receive the issued media content and play back the media content. The process is as follows:

Step 101: The client initiates a logon request in HTTP to the HTTP server, with the user name and the password carried in the request message; in this example, the user name is Alice, and the password is 12345.

Step 102: The HTTP server authenticates the request from the client, and, if the authentication is successful, returns an HTTP 200 OK response message to the client.

Step 103: The client accomplishes the user logon process. Next, for the streaming media content of interest, if the client wants to play the content, it will send an HTTP GET request to the HTTP server, to obtain the URI of the streaming media content that is required to play back the streaming media content in Real-Time Streaming Protocol (RTSP). In this example, a request for the URI is initiated by means of an HTTP GET request.

Step 104: Because the HTTP server is only a Portal for the streaming media server, it does not store any media information or the URI of the corresponding streaming media content. Upon receiving the HTTP GET request, the HTTP server sends the HTTP GET request for the URI of the streaming media content to the streaming media server.

Step 105: When receiving the HTTP GET request from the HTTP server, the streaming media server generates a URI address for the streaming media player in accordance with the address of the streaming media content requested in the HTTP GET request, and sends the URI in an HTTP 200 OK response message to the HTTP server in RTSP protocol. In addition, the streaming media server records generation time of the URI, and set a validity period for the URI locally. When the streaming media client requests for the streaming media content by means of the URI address, the request is valid only in the validity period, and invalid when the validity period expires.

Step 106: The HTTP server returns the URI address of the streaming media content obtained from the streaming media server in the HTTP 200 OK response to the client that requests for the URI address.

Step 107: The obtained URI address of the streaming media content is used by the client for initiating a streaming media obtaining request in RTSP protocol. In this example, an RTSP PLAY command is used for playing back the streaming media content specified by the URI. The RTSP message is not forwarded by the HTTP server; instead, the obtained URI can be directly manipulated in RTSP protocol.

Step 108: The streaming media server authenticates validity and time limitation of the requested URI address after receiving the RTSP PLAY request from the client, and, if the authentication is successful, returns an RTSP 200 OK response message to the client that initiates the request.

Step 109: The streaming media server transmits the media streaming containing the streaming media content in RTP/RTCP protocol to the client. The client watches the requested media content normally.

Step 110: After the media content has been watched by the client, the client initiates a link teardown process. The process is accomplished with an RTSP TEARDOWN command.

Step 111: When receiving an RTSP TEARDOWN command, the streaming media server disconnects the transmitting media streaming. After that, it returns an RTSP 200 OK response message to the user, to notify the user of the successful result. In this example, the 200 OK response is ignored.

Step 112: After a period, i.e., when the original URI requested by the client expires, the client initiates a streaming media content playback request to the streaming media server by utilizing the original URI address according to the original process.

Step 113: When receiving such a request, the streaming media server judges validity of the URI; if the streaming media server finds the URI has expired, it returns a failure request.

Step 114: After the client modifies the URI address in the RTSP request, it sends a streaming media content playback request again.

Step 115: The streaming media server authenticates the received URI address again; if the streaming media server finds the URI is invalid, it returns a failure request.

Figure 2:
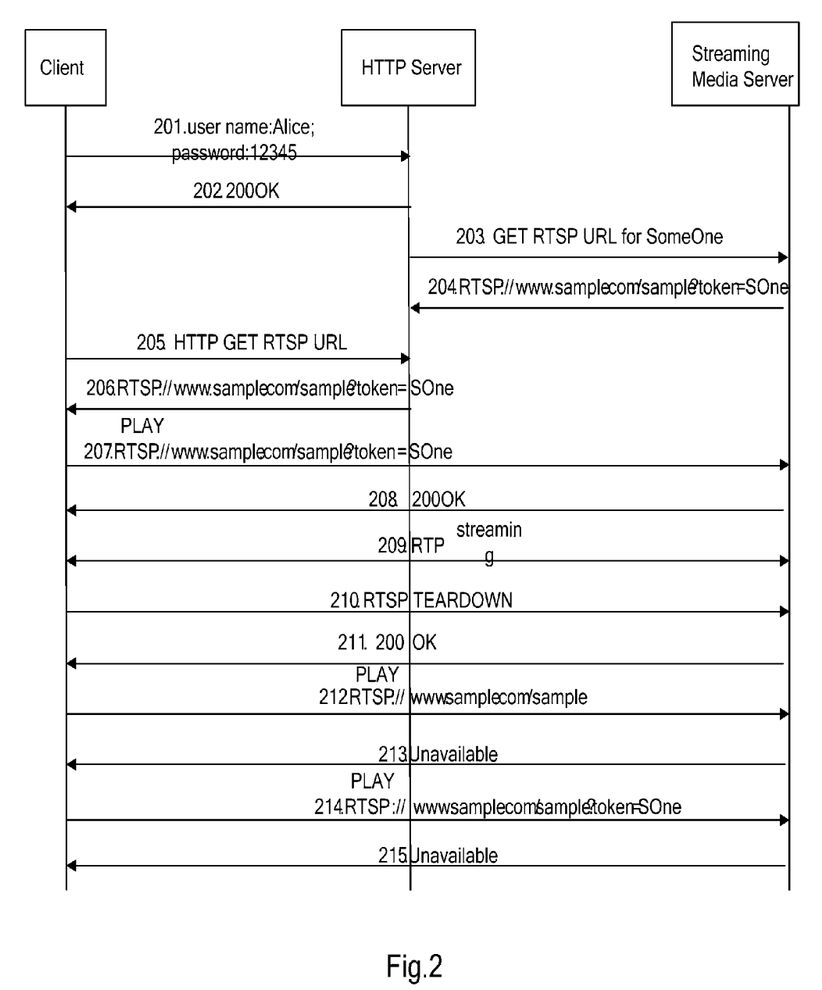
FIG. 2 shows a timing sequence diagram of another streaming media authentication method in the prior art.

Alternatively, the identity authentication and streaming media on demand functions can be implemented as shown in FIG. 2. In FIG. 2, the steps 201, 202, and 206-215 are identical to the steps 101, 102, and 106-116 shown in FIG. 1, and therefore will not be described further here; the steps 203-205 are different from the steps 103-105 shown in FIG. 1, and are as follows:

Step 203: After the user logs on the HTTP server, the HTTP server requests for a set of URI addresses that may be used by the user from the streaming media server. The request is initiated by means of an HTTP GET request.

Step 204: The streaming media server returns the URI information of streaming media for a certain user to the HTTP server in HTTP protocol, from the URIs requested by the HTTP server. The HTTP server buffers the URI for the user for later use.

Step 205: The user chooses the streaming media content to be played and requests for the URI of the media content from the HTTP server in HTTP protocol.

It can be seen from above that the conventional resource authentication scheme has the following technical problems: 1. It is inconvenient for implementing access right control for streaming media contents or reuse of resources; 2. All of the control has to be accomplished through a third-party HTTP server, and therefore the cost is very high.

SUMMARY OF THE INVENTION

Embodiments of the present invention provides an easy-to-use method for controlling an electronic device and a streaming media server, so as to implement control of the electronic device from the terminal in the streaming media playback process and enhance accessibility and security of the electronic device, and reduce the cost.

The embodiments of the present invention further provide an authentication method for controlled electronic device resources, so as to improve security in the application of camera resources.

To address above technical issues, the embodiments of the present invention provide a method for controlling an electronic device. The method includes:

receiving electronic device control information, which is included in the initial line, header field, message body in the network control protocol, or a combo including any combination of the initial line, header field, and message body;

parsing out the electronic device control information from the initial line, header field, message body, or the combo including any combination of the initial line, header field, and message body; and controlling the electronic device according to the control information.

The embodiments of the present invention further provide an authentication method for controlled electronic device resources. The method includes:

receiving client authentication information, which is included in the initial line, header field, message body in the network control protocol, or a combo including any combination of the initial line, header field, and message body; and parsing out the client authentication information from the initial line, header field, message body, or the combo of any combination of the initial line, header field, and message body, and authenticating the client according to the information.

Furthermore, the embodiments of the present invention provide a streaming media server, including: an information parsing unit, adapted to parse the received client message, i.e., parse out the electronic device control information from the initial line, header field, message body in the network control protocol, or a combo including any combination of the initial line, header field, and message body in the message containing the control information for the controlled electronic device; an executing unit or an information transmitting unit, wherein, the executing unit is adapted to execute corresponding actions in accordance with the control information; and the information transmitting unit is adapted to transmit the control information to the electronic device.

Furthermore, the embodiments of the present invention provide a streaming media server. The server includes:

a receiving unit, adapted to receive the control information for the electronic device from the client; the control information is included in the initial line, header field, or message body in the network control protocol, or a combo including any combination of the initial line, header field, and message body;

a parsing unit, adapted to parse out the control information for the electronic device from the initial line, header field, message body, or the combo including any combination of the initial line, header field, and message body; and a control unit, adapted to control the electronic device according to the control information.

Further, the embodiments of the present invention provide a streaming media server. The server includes:

a receiving unit, adapted to receive the client authentication information from the client; the client authentication information is included in the initial line, header field, or message body in the network control protocol, or a combo comprising any combination of the initial line, header field, and message body;

a parsing unit, adapted to parse out the client authentication information for the electronic device from the initial line, header field, message body, or the combo including any combination of the initial line, header field, and message body; and an authenticating unit, adapted to authenticate the client according to the authentication information.

It is seen from above technical scheme: In the embodiments of the present invention, since the control information for the electronic device is included in the initial line, header field, message body, or a combo including any combination of the initial line, header field, and message body in the network control protocol, the user can transmit control signaling to the streaming media server conveniently by utilizing widely used network techniques from the client, and the control information is then forwarded to the electronic device from the streaming media server or the streaming media server controls the electronic device directly, so as to implement remote control of the electronic device from the client conveniently. Alternatively, since the client authentication information is included in the initial line, header field, message body, or a combo including the initial line, header field, and message body in the network control protocol, the user can carry out authentication with the streaming media server conveniently by utilizing popular streaming techniques from the client, so as to implement user access right management and resource allocation functions, thus improve security and practicability.

DETAILED DESCRIPTION OF THE EMBODIMENTS

Considering that the embodiments in the present invention involve streaming media techniques, the streaming media techniques will be introduced before the embodiments are described.

The streaming media service is a sort of multimedia service that was applied widely in Internet originally. It enables the user to access a streaming media server from a PC over Internet to download or play back video/audio contents from the streaming media server. Those contents can be video/audio clips (e.g., movie clips) stored in the streaming media server in advance or live broadcast contents transmitted to the streaming media server from cameras, such as live ball matches.

The streaming media service defined in Request For Comments (RFC) mainly involves three major techniques:

1. Real Time Transfer Protocol (RTP), which is adapted to implement streaming media content transmission function;

2. Real Time Transfer Control Protocol (RTCP), which is adapted to control the streaming media content transmission; and 3. Real Time Streaming Protocol (RTSP), which is adapted to define streaming media session control.

Hereinafter, the RTSP protocol will be described.

RTSP is an application layer protocol, which is mainly designed to control real-time data transmission. RTSP provides an extensible framework, which makes it possible to realize control of real-time data (e.g., audio and video content) and real-time data on demand. The data sources include field data and data stored in clips. The protocol is used to control multiple data transmitting connections and provide an approach to choose the data transmitting channel, such as User Datagram Protocol (UDP), multicast UDP, and Transport Control Protocol (TCP), and provide an approach to choose an RTP-based transport mechanism.

RTSP can be used to establish and control one or more time-synchronized continuous media streaming. Though it is possible that the continuous media streaming and the control streaming can be transmitted in alternate, usually it does not transmit continuous streaming itself. In other words, RTSP acts as a remote network controller for the streaming media server. The RTSP connections are not bound to any connection on the transport layer, such as TCP connection. During the RTSP connection period, the RTSP user can open or close multiple optional transport connections to the streaming media server to send RTSP requests. Furthermore, a connection-less transport protocol, such as UDP, can be used. Though streaming controlled by RTSP may be applied to RTP, RTSP operations do not rely on the continuous media transport mechanism. RTSP is similar to HTTP/1.1 in syntax and operation, and therefore most HTTP extension mechanisms can be used in RTSP.

RTSP has many features, such as:

Extensibility: A new method and parameter can be added to RTSP easily. In the embodiments of the present invention, this feature is utilized to control camera and assistant equipment and carry out authentication for requests using camera resources.

Easy-to-parse: RTSP can be parsed by a standard HTTP or Multipurpose Internet Mail Extensions (MIME) parser.

Recording device control capability: RTSP can control the recording and playback equipment, and Suitable for professional applications: with the SMPTE (The Society of Motion Picture and Television Engineers, which is a time code concept widely used for time synchronization and counting between devices in audio/video industry presently) time scale, RTSP supports frame-level accuracy and enables remote digital editing. This feature is the basis for the embodiments in the present invention.

Composition of RTSP:

RTSP employs the traditional client/streaming media server model. The client requests the streaming media server to carry out appropriate processing by sending an RTSP request message to the streaming media server; the streaming media server handles the RTSP request message from the client, and returns a response message to the client.

An RTSP request message includes three parts: an initial line (the "Method" in the control protocol message), a header field, and a message body.

The format of the initial line is as follows:

Request-Line=Method SP Request-URI SP RTSP-Version CRLF where, Method is the "Method" in the control protocol message in the embodiments of the present invention.

Method = "DESCRIBE"| "ANNOUNCE" | "GET_PARAMETER" | "OPTIONS" | "PAUSE"
 | "PLAY" | "RECORD" | "REDIRECT" | "SETUP" | "SET_PARAMETER"
 | "TEARDOWN" | extension-method
 extension-method = token
 Request-URI = "*" | absolute_URI
 RTSP-Version = "RTSP" "/" 1*DIGIT "." 1*DIGIT The format of the header field is as follows:

request-header=Accept|Accept-Encoding|Accept-Language|Authorization|From|If-Modified-Since|Range|Referer|User-Agent The message body is a unit that carries other information, such as Session Description Protocol (SDP), etc.

The entire description of an RTSP request message is as follows:

ANNOUNCE rtsp://server.example.com/meeting RTSP/1.0
CSeq: 90
Content-Type: application/sdp
Content-Length: 121

The format of RTSP response is similar to the format of RTSP request message. The only difference is that the initial line is replaced by a status code. The format is as follows:

Status-Line=RTSP-Version SP Status-Code SP Reason-Phrase CRLF

For example:

RTSP/1.0 200 OK

Extension of RTSP:

Since not all streaming media servers have identical functions, it is necessary for the streaming media servers to support different request sets. RTSP can be extended in any of the following three ways:

extending by changing the sorting order;

extending by adding new parameters: for example, if the user requires a rejection announcement but the method extension does not support; appropriate RTSP Header should be added as new parameters to the required RTSP Message;

extending by adding a new method (i.e., extension of method): for example, if the receiver does not understand the request and returns an error code 501 (not implemented yet), the sender shall not retry the method. The user can query for the methods supported by the streaming media server with the OPTIONS method; and the streaming media server lists the supported methods in the header of a common response.

In addition, the extension can be implemented by adding a new type of message body; the user can transmit data in different sizes in the RTSP message body. Transmitting data between the client and the streaming media server in such a way is highly flexible. In order to enable the streaming media server and the client to identify the information transmitted between them, the message body format shall be extended, and the information is transmitted in the extended format. A typical message body extension pattern is of an extended MIME type.

In the embodiments of the present invention, streaming media techniques are applied to the client to control the camera and the assistant equipment. In the embodiments of the present invention, control operations and parameter transmission can be implemented by extending existing control protocols, such as SIP, RTSP, HTTP or other protocols. In the embodiments, the control of electronic devices (e.g., cameras) and other assistant equipment (e.g., projectors, robot arms, etc.) during the streaming media playback process is mainly described in the case of RTSP; for other protocols, since they are quite similar to RTSP, the control of the camera and assistant equipment can be implemented in a way similar to the way in the case of RTSP. Also, in the embodiments of the present invention, the control of electronic devices can be implemented in RTSP independent to the media playback process.

The control of the camera and assistant equipment in RTSP from the client involves three aspects:

1. Creating a method for controlling the camera and assistant equipment in RTSP;

2. Extending RTSP to include several header fields for control of the camera and assistant equipment and a header field for user authentication;

3. Extending RTSP to include a MIME type for control of the camera and assistant equipment.

In the embodiments of the present invention, by utilizing above three technical aspects individually or in combination, the electronic devices can be controlled safely, conveniently, and quickly in RTSP protocol. Hereunder the three technical aspects will be described in detail.

1. In the embodiments of the present invention, the RTSP method is extended mainly by constructing an ACTION method. The ACTION method is identical to the existing method in RTSP, such as DESCRIBE, ANNOUNCE, GET_PARAMETER, OPTIONS, PAUSE, PLAY, RECORD, REDIRECT, SETUP, SET_PARAMETER, and TEARDOWN in syntax, message structure, and message handling mechanism. The name of the ACTION method is not unique, and can be any other name; the application scenario of the ACTION method is, for example, shown in Table 1. In Table 1, P: presentation, which is designed for presentation; S: Streaming, which is designed to obtain the media streaming; C: client; S: Server, i.e., streaming media server; C→S: Client to Server, i.e., Client to streaming media Server; S→C: Server to Client, i.e., streaming media Server to Client.

TABLE 1

| Method | Direction | Target | Necessity |
|---|---|---|---|
| DESCRIBE | C->S | P, S | Recommended |
| ANNOUNCE | C->S, S->C | P, S | Optional |
| GET_PARAMETER | C->S, S->C | P, S | Optional |
| OPTIONS | C->S, S->C | P, S | Required (S->C: optional) |
| PAUSE | C->S | P, S | Recommended |
| PLAY | C->S | P, S | Required |
| RECORD | C->S | P, S | Optional |
| REDIRECT | S->C | P, S | Optional |
| SETUP | C->S | S | Required |
| SET_PARAMETER | C->S, S->C | P, S | Optional |
| TEARDOWN | C->S | P, S | Required |
| ACTION | C->S | P, S | Optional |

The essential difference between the ACTION method and other methods is: the ACTION method is mainly designed to control the camera and assistant equipment, while other methods are used in dedicated cases.

When it is required to send a control message to the camera and assistant equipment, the client sends the desired camera operating parameters and actions to the streaming media server with the RTSP ACTION method. When receiving the RTSP ACTION method from the client, the streaming media server handles the content and information in the method, judges whether the required resources are available, and returns an appropriate response message (200 OK if succeeded), in accordance with its processing result; the camera and assistant equipment accomplish corresponding actions when they receive the response message.

The operations of the camera and assistant equipment implemented with the ACTION method include at least one of the following obtaining combinations, but not limited to them:

1. Actions of the camera, refer to movement, and status change of the camera, etc., mainly including:

Camera movement directions, such as up, down, left, or right, etc., and movements in oblique directions if the camera supports;

Camera movement speed, which mainly refers to angular speed, i.e., camera revolving angle per second;

Camera reset, i.e., returning to the original position of the camera;

Camera scan, i.e., scanning at a certain speed in a predefined route;

Camera open or close;

Release of camera control function/knock-out, and resource release, etc.

2. Actions of the lens, refer to Lens operations, parameter setting, etc., mainly including:

Lens brightness;

Lens contrast;

Lens zoom;

Image shooting;

Setting of other shooting parameters of the lens;

Lens reset, i.e., returning to the original setting of the lens, etc.

3. Actions of assistant equipment. The so-called assistant equipment refers to equipment that can be interlocked to the camera or work with the camera, Such as light source, infrared light source, sound source, and alarm device, etc. The actions of the assistant equipment include:

Control of assistant light source, such as flash light, white light source, infrared light source, etc.;

Control of assistant sound source, such as loudspeakers, etc.; and

Control of assistant alarms, such as sirens, and alarm devices, etc.

2. In the embodiments of the present invention, the RTSP header field is extended mainly by constructing a series of RTSP header fields, to implement control of the camera and assistant equipment. The RTSP header fields constructed in the embodiments of the present invention are mainly used to transmit control information and parameters of the camera and assistant equipment and accomplish transmission of the information between the client and the streaming media server.

The constructed header fields are similar to the existing RTSP header field in syntax, message structure, and message handling mechanism. The difference lies in the applications scenarios and the functions.

In accordance with the actions to be finished as described above during the control process of the camera and assistant equipment, in the embodiment of the present invention, the RTSP header field is extended to mainly include the following header fields:

1. MoveDirection

Control of the camera movement direction, such as up, down, left, or right, etc.; and, if the camera supports, movement in oblique directions is also available. The format is as follows:

MoveDirection = "MoveDirection" ":" Directionvalue
Directionvalue = "UP" | "DOWN" | "RIGHT" | "LEFT" | "UPLEFT" |
    "UPRIGHT" | "DOWNLEFT" | "DOWNRIGHT"
Moving left is represented as:
MoveDirection : LEFT 2. MoveSpeed Camera movement speed, mainly refers to angular speed, i.e., camera revolving angle per second. The format is as follows:

MoveSpeed="MoveSpeed" ":" Speedvalue

Speedvalue=DIGIT

Moving at angular speed of 5 degree/s is represented as:

MoveSpeed: 5

3. ResetPosition

Camera reset, i.e., returning to the original position of the camera. The format is as follows:

ResetPosition="ResetPosition" ":" Positionvalue

Positionvalue="YES"|"NO"

Resetting to the original camera position is represented as:

ResetPosition: YES

4. CameraScan

Camera scan i.e., scanning at a certain speed in a predefined route. The format is as follows:

CameraScan="CameraScan" ":" Scanway ";" Scanspeed

Scanway="BeeLine"|"SINLine"|"HelixLine"

Scanspeed=DIGIT

Scanning at 5 degree/s in linear scanning mode is represented as:

CameraScan: BeeLine; 5

5. CameraSwith

Camera open or close. The format is as follows:

CameraSwitch="CameraSwitch" ":" Switchvalue

Switchvalue="ON"|"OFF"

Closing the camera is represented as:

CameraSwitch: OFF

6. FreeCamera

Camera control function, due to the fact that the camera is a scare resource and can not be occupied by two users at the same time, the camera should be released before it can be used by another user; in addition, it is possible that an administrator with higher priority can knock out a user who is occupying the camera. The format is as follows:

FreeCamera="FreeCamera" ":" Freevalue

Freevalue="Free"|"Knockout"

In the case of knocking out a user by force,

FreeCamera: Knockout

7. Brightness

Lens brightness, by adjusting the brightness, better streaming media/shooting effect can be attained. The format is as follows:

Brightness="Brightness" ":" Brightnessvalue

Brightnessvalue=DIGIT

Adjusting the brightness to 5 can be represented as:

Brightness: 5

8. Contrast

Lens contrast, which is used to attain better shooting effect. The format is as follows:

Contrast="Contrast" ":" Contrastvalue

Contrastvalue=DIGIT

Adjusting the contrast to 8 can be represented as:

Contrast: 8

9. Zoom

Lens zoom; lens zoom-in or zoom-out is supported, facilitating lens focusing and improving shooting quality. The format is as follows:

Zoom="Zoom" ":" Zoomvalue

Zoomvalue="ZoomIn"|"ZoomOut"

Zooming in the lens can be represented as:

Zoom: ZoomIn

10. ResetCamera

Lens reset, i.e., returning to the original parameter setting of the lens. The format is as follows:

ResetCamera="ResetCamera" ":" Cameravalue

Cameravalue="YES"|"NO"

Resetting lens parameters can be represented as:

ResetCamera: YES

11. AssistantLight

Control of assistant light source, for improving shooting quality. The format is as follows:

AssistantLight="AssistantLight" ":" Lightvalue

Lightvalue="ON"|"OFF"

Opening the assistant light source can be represented as:

AssistantLight: ON

12. AssistantSound

Control of assistant sound source, which can be accomplished while shooting. The format is as follows:

AssistantSound="AssistantSound" ":" Soundvalue
Soundvalue="ON"|"OFF"

Opening the assistant sound source can be represented as:
AssistantSound: ON

13. AssistantAlarm

Control of assistant alarm device, which can be used to trigger alarm while shooting. The format is as follows:

AssistantAlarm="AssistantAlarm" ":" Alarmvalue
Alarmvalue="Alarm ON"|"Alarm OFF"|"Call Police ON"|"Call Police OFF"

Opening the alarm device can be represented as:
AssistantAlarm: Alarm ON

The extended header fields in above 1~6 are used to control camera movement; the extended header fields in above 7~10 are used to control the camera lens; the extended header fields in above 11~13 are used to control assistant equipment associated to the camera.

Figure 3:
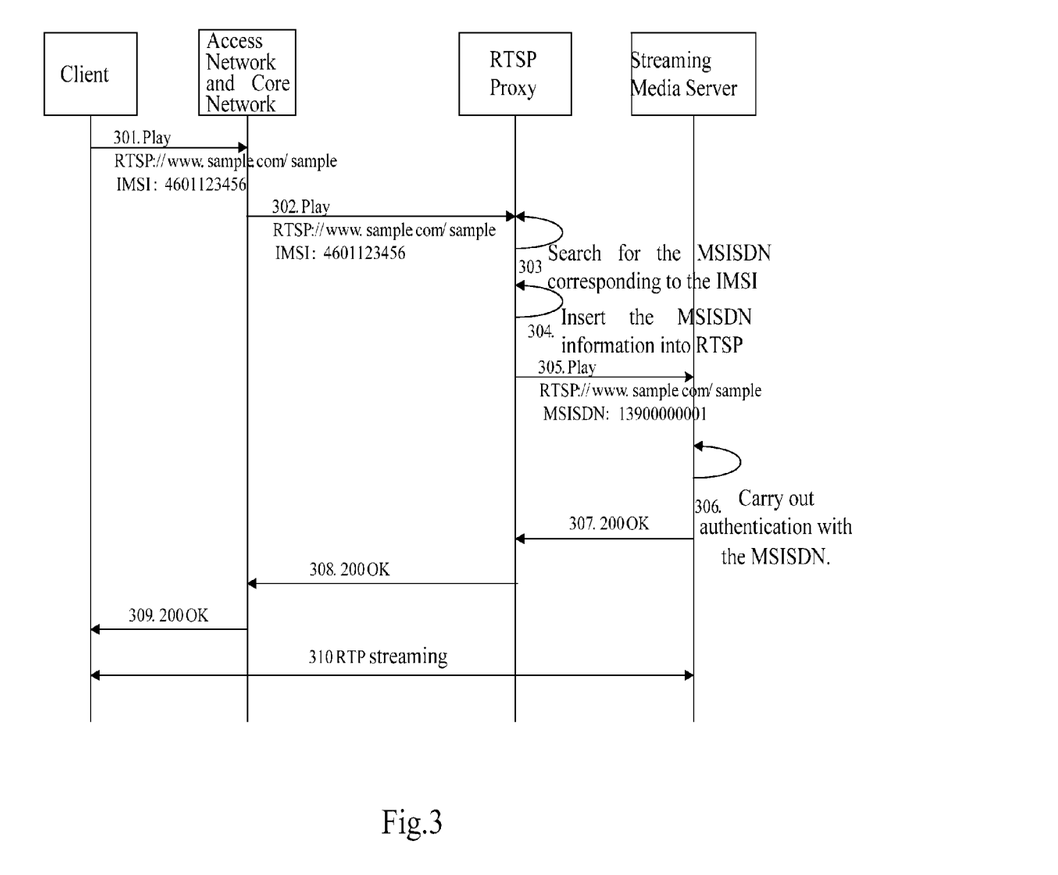
FIG. 3 shows a timing sequence diagram of an authentication method for controlled electronic device resources according to an embodiment of the present invention.

FIG. 3 shows the timing sequence diagram of an authentication method for controlled electronic device resources according to an embodiment of the present invention. The process is as follows:

Step 301: The client sends a streaming media content playback request message to the access network and the core network to request for playing back the streaming media content with the URI being Play RTSP://www.sample.com/sample; in addition, the request message also carries an International Mobile Subscriber Identity (IMSI): 4601123456.

Step 302: The access network and the core network forward the received playback request message to the RTSP proxy.

Step 303: When receiving the playback request message, the RTSP proxy searches for the MSISDN information corresponding to the IMSI.

Step 304: The RTSP proxy inserts the obtained Mobile Station International ISDN Number (MSISDN) information into the RTSP message. A viable method is to extend an MSISDN header field in the RTSP protocol to carry the relevant content, i.e.:

RTSP://www.sample.com/sample,
MSISDN: 1390000000

Step 305: The RTSP proxy forwards the modified RTSP request message (i.e., the RTSP message carrying the MSISDN information and the original URI of the streaming media content) to the streaming media server.

Step 306: The streaming media server carries out authentication for the MSISDN carried in the received request message.

Step 307: The streaming media server feeds back the result to the RTSP proxy, i.e., sends a 200 OK response message.

Step 308: The RTSP proxy forwards the 200 OK response message to the access network and the core network.

Step 309: The access network and the core network forward the 200 OK response message to the client.

Step 310: The streaming media server transmits the RTP streaming to the client.

That is to say, when the camera and assistant equipment are controlled in RTSP protocol, the challenge of how to carry out authentication in RTSP before the camera and assistant equipment are controlled should be overcome, besides the control information and parameters are transmitted to the streaming media server.

Carrying out authentication for the client/user (hereunder the case of "user" will be described) on the streaming media server not only ensures that any unauthorized user can not operate the camera, but also enables users with higher access right can free the camera resources when necessary and obtain the camera control right by force, which is advantageous for handling of emergencies.

To solve the problems related to conflicts in resource occupation when multiple users access the controlled electronic device, the embodiments in the present invention employ an access priority/right control mechanism.

In order to combine identity authentication and access right control with RTSP and transfer the identity authentication and access right control functions to the streaming media server, the RTSP header field can be further extended, and an RTSP proxy entity can be used to implement those functions.

The extended header field for handling identity authentication and access right control contains the following IMSI and MSISDN (also referred to as mobile phone number):

14. IMSI

It is used to implement RTSP IMSI information transmission function. The IMSI information is obtained from the client and written into the RTSP message; the RTSP message is transmitted to the RTSP Proxy through the access network and the core network. The format is as follows:

IMSI="IMSI" ":" IMSIvalue
IMSIvalue=DIGIT

The IMSI of a subscriber of China Mobile is represented as:
IMSI: 4601123456

15. MSISDN

It is used to implement RTSP MSISDN information transmission function. When receiving the IMSI information sent from the client, the RTSP Proxy searches the HLR for obtaining the MSISDN information. And the RTSP Proxy writes the information into the RTSP message, removes the IMSI entry in the RTSP message, and transmits the message to the streaming media server. The format is as follows:

MSISDN="MSISDN" ":" MSISDNvalue
MSISDNvalue=DIGIT

The IMSI of a "139" subscriber of China Mobile is represented as:
MSISDN: 13900000001

Here, the authentication method provided in the present invention will also be described in the example of the camera and other assistant equipment. When receiving the MSISDN information sent from the client, the streaming media server compares the information with the information stored in the control unit of the streaming media server, to judge the user's access rights. If the user does not have the right to control the camera and other assistant equipment, or does not have the right to watch the streaming media content, the streaming media server returns a failure message; otherwise it returns a success message.

If another user with a higher priority requests to control the camera when the camera is controlled by a user, the streaming media server judges the difference between the access rights of the two users through authentication. On the basis of the authentication result, the streaming media server releases the right of use from the user with lower access rights at the request of the user with higher access rights, so as to ensure the user with higher access rights can use the resources effectively and conveniently.

When the camera and assistant equipment are controlled in RTSP protocol, one or more of above extended header fields, or any combination of multiple header fields can be utilized to implement that function.

3. A MIME type for control of the camera and assistant equipment is extended in RTSP. In the embodiments of the present invention, the RTSP message body can be extended to include a MIME type to implement control of the camera and assistant equipment. In the MIME type, the specific operation of the camera and the parameters description of the operation, as requested by the client, can be carried. When receiving the message body in the MIME type, the streaming media server parses the message body in the MIME type to extract relevant operation information, and then handles the information and executes appropriate operations on camera.

In the embodiments of the present invention, a MIME type named as application/cameraAction+xml (Extensible Mark-Up Language) is added to implement above functions; however, the extension is not limited to this MIME type. With the MIME type, the camera control command is encapsulated in an xml file, and the xml file is placed into the RTSP message body and transmitted to the streaming media server; the streaming media server parses out the xml file from the RTSP message body, processes the information carried in the xml file, and operates the camera accordingly, so as to implement camera control function.

The name of the MIME type is application/cameraAction+xml. The format is as follows:

```
<?xml version="1.0" encoding="GB2312" ?>
<!ELEMENT RTSP_CameraAction (CameraActionRequest?,
CameraActionResponse?)>
<!ELEMENT CameraActionRequest (CameraAction, LensAction,
AssistantEquipmentAction )>
<!ELEMENT    CameraActionResponse    (CameraAction,
LensAction, AssistantEquipmentAction )>
<!ELEMENT CameraAction EMPTY>
<!ATTLIST CameraAction
      MoveDirection      CDATA#REQUIRED
      MoveSpeed          CDATA#REQUIRED
      ResetPosition      CDATA#REQUIRED
      CameraScan         CDATA#REQUIRED
      CameraSwitch       CDATA#REQUIRED
      FreeCamera         CDATA#REQUIRED
>
<!ELEMENT LensAction EMPTY>
<!ATTLIST LensAction
      Brightness         CDATA#REQUIRED
      Contrast          CDATA#REQUIRED
      Zoom               CDATA#REQUIRED
      ResetCamera        CDATA#REQUIRED
>
<!ELEMENT AssistantEquipmentAction EMPTY>
<!ATTLIST AssistantEquipmentAction
      AssistantLight     CDATA#REQUIRED
      AssistantSound     CDATA#REQUIRED
      AssistantAlarm     CDATA#REQUIRED
>
```

With the Document Type Definition (DTD) format defined above, the client can initiate a camera operation request to the streaming media server, with the parameters carried in an xml file; the xml can also be defined in the form of Schema. Through conversion, the DTD data format can also be converted to Schema format; therefore, they have similar efficacy. The camera operation request is described above. Table 2 shows an example of implementing camera control function by means of RTSP MIME type extension.

TABLE 2

| | |
|---|---|
| ACTION RTSP://WWW.Sample.com/SampleCamera RTSP/1.0 | Request Line |
| CSeq: 90<br>Content-Type: application/cameraAction+xml<br>Content-Length: 121 | Header |

TABLE 2-continued

| | |
|---|---|
| <?xml version="1.0" encoding="GB2312" ?><br><RTSP_CameraAction><br>  <CameraActionRequest><br>    <CameraAction><br>      <MoveDirection = "UP" /><br>      <MoveSpeed = "5" /><br>    <CameraAction/><br>    <Lens><br>      <Brightness = "5" /><br>    <Lens/><br>    <AssistantEquipment><br>      <FlashLight = "ON" /><br>    <AssistantEquipment/><br>  <CameraActionRequest/><br><RTSP_CameraAction/> | Body |

The extension of RTSP Method (i.e., initial line, the same below), header field, and message body is described above. The camera and assistant equipment can be controlled with RTSP message in any of the following three ways: carrying the information in the header field, carrying the information in the message body, or carrying the information in the header field and the message body; however, the implementation of the control function is not limited to the three ways. The structures for the header field carrying information, message body carrying information, and both the head field and the message body carrying information are shown in Table 3:

TABLE 3

| ACTION | ACTION | ACTION |
|---|---|---|
| Header for<br>Camera Control | <br>Body for<br>Camera Control | Header for<br>Camera Control<br>Body for<br>Camera Control |

The existing RTSP extension method for camera control can also be used according to the extension method in the embodiments of the present invention. This can avoid modifications to the existing method and improve compatibility; or, the same objective can be attained by extending the functions of the existing method, as shown in Table 4:

TABLE 4

| PLAY | PLAY | PLAY |
|---|---|---|
| Header for<br>Camera Control | <br>Body for<br>Camera Control | Header for<br>Camera Control<br>Body for<br>Camera Control |

It has been described as above how to extend or define the method, header field, message body of the network control protocol or a combo including any combination of the method, header field, and message body of the network control protocol by utilizing streaming techniques. Hereunder the control method of camera shot devices and the authentication method of camera shot device resources in the present invention will be described.

First, an embodiment of the present invention provides a method for controlling an electronic device. The method includes:

receiving electronic device control information sent from the client, by the streaming media server; the electronic device control information is included in the Method, header field, or message body, or a combo including any combination of the Method, header field, and message body in the internet control protocol;

parsing out the electronic device control information for controlling the electronic device, by the streaming media server, from the Method, header field, message body, or the combo including any combination of the Method, header field, and message body; and controlling the electronic device according to the control information.

In above method, by including the electronic device control information in the Method, header field, message body of the network control protocol, or a combo including any combination of the Method, header field, and message body, the user can transmit the control information to the streaming media server conveniently utilizing popular network techniques; and the streaming media server forwards the control information to the electronic device, or, the streaming media server directly control the electronic device; in this way, the function of remote control of the electronic device from the client is implemented easily and conveniently.

The electronic device may be a camera or the assistant equipment for a camera, or a projector or robot arm in other embodiments.

In addition, an embodiment of the present invention further provides an authentication method for a controlled electronic device. The method includes:

receiving the client authentication information from the client, by the streaming media server; the client authentication information is included in the Method, header field, or message body in the network control protocol, or a combo including any combination of the Method, header field, and message body in the network control protocol; and parsing out the client authentication information, by the streaming media server, from the Method, header field, message body, or the combo including any combination of the Method, header field, and message body, and judging whether the client passes the authentication successfully in accordance with the authentication information.

Likewise, by including the client authentication information in the Method, header field, message body, or a combo including any combination of the Method, header field, and message body in the network control protocol, the user can carry out authentication with the streaming media server conveniently utilizing widely used network techniques, so as to implement user access right management and resource allocation function, and improve security and practicability.

Figure 4:
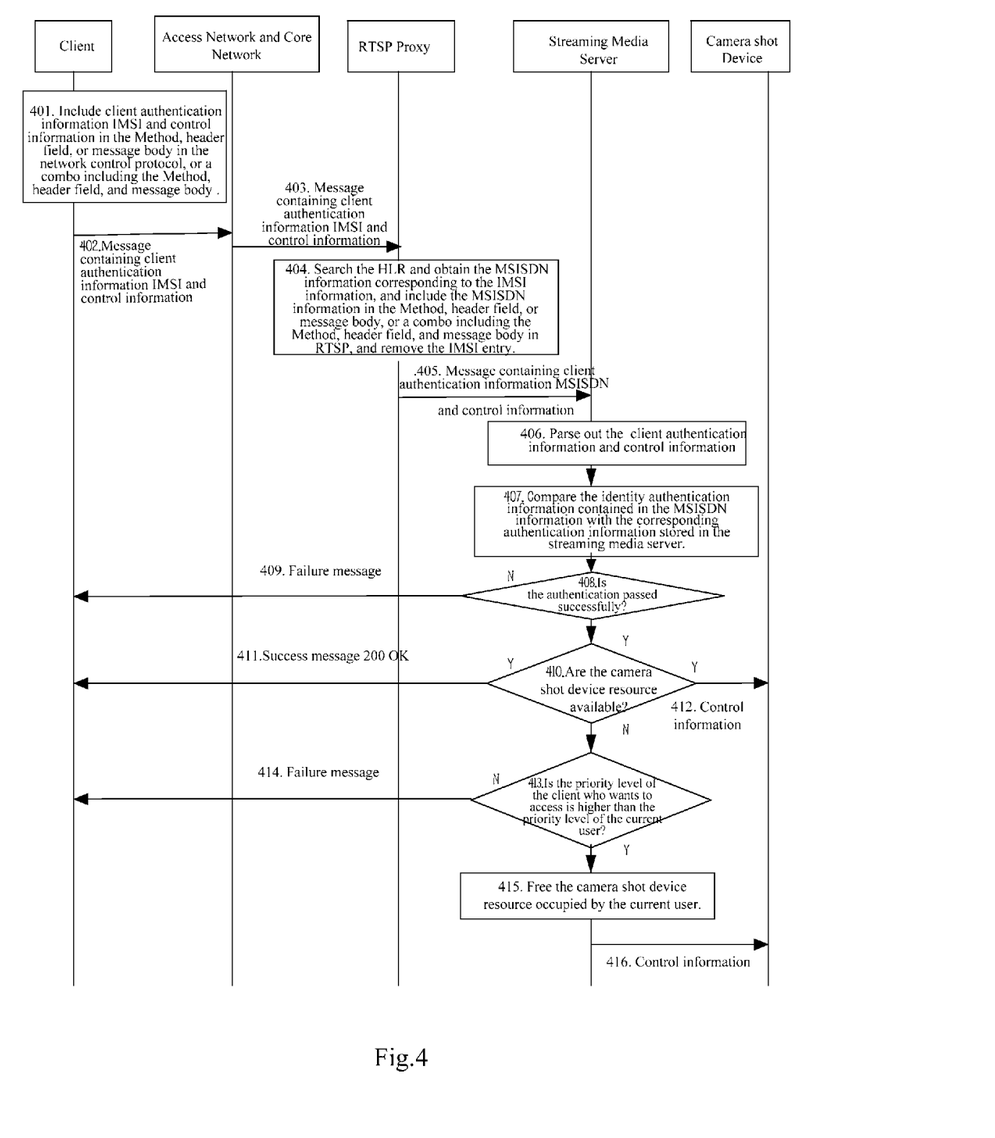
FIG. 4 shows a timing sequence diagram of a combination of an electronic device control method and a resource authentication method according to an embodiment of the present invention.

FIG. 4 shows the entire process from electronic device authentication to control, which is implemented by combining the authentication method for a controlled electronic device and the method for controlling an electronic device provided in the present invention.

The entire process from electronic device authentication to control includes the following steps.

Step 401: The client or terminal (it is a client in this embodiment) includes the client authentication information and/or control information in the Method, header field, message body in the network control protocol, or a combo including any combination of the Method, header field, and message body.

The client authentication information includes user identity authentication information (e.g., the identity authentication information in the identity authentication field in IMSI and MSISDN contained in the extended header field). In this embodiment, the user identity authentication information is carried in an IMSI header field; the IMSI is obtained from the client during authentication and is added to the Method, header field, message body, or a combo including any combination of the Method, header field, and message body of the RTSP message. The client authentication information can further include access right control information, such as level information or indication for directly freeing the electronic device resources.

The network control protocol includes SIP, RTSP, or HTTP; the RTSP Method may include the ACTION method or PLAY method shown in Table 1; the control information or authentication information can be added into the Method structures shown in Table 3 and Table 4. The control information may include parameters for controlling movement of the camera device, lens, or assistant equipment. In addition, in the embodiment of the present invention, the message body of RTSP can also be extended to construct the MIME type of "application/cameraAction+xml" structure shown in Table 2.

Step 402: The client sends the message containing the client authentication information (IMSI) and control information to the access network and the core network.

Step 403: The access network and the core network forward the message containing client authentication information (IMSI) and control information to the RTSP proxy.

Step 404: When receiving the IMSI information, the RTSP proxy searches the HLR to obtain the MSISDN information corresponding to the IMSI information, and add the MSISDN information into the Method, header field, message body of RTSP, or the combo including any combination of the Method, header field, and message body, and remove the IMSI entry.

Step 405: The RTSP proxy sends the message containing client authentication information (MSISDN) and control information to the streaming media server.

Step 406: The streaming media server parses out the client authentication information (MSISDN) and control information.

Step 407: When receiving the MSISDN information, the streaming media server compares the identity authentication information contained in the MSISDN information with the corresponding authentication information stored in the streaming media server.

Step 408: The streaming media server judges whether the authentication is passed successfully; if the authentication is passed successfully, the streaming media server executes step 410; otherwise it executes step 409.

Step 409: if the comparison result indicates the information does not match, the streaming media server judges that the client has no right to control the electronic device or watch the streaming media content, and thereby returns a failure message to the client.

Step 410: The streaming media server judges whether the electronic device resource is available.

Step 411: If the electronic device resource (e.g., camera shot device) is available, the streaming media server returns a success message 200 OK to the client, and then executes step 412.

Step 412: The streaming media server sends the electronic device control information to the electronic device.

Step 413: If the electronic device resource is unavailable (occupied by a user for the moment), the streaming media server compares the priority level of the current user and the priority level contained in the identity authentication information, i.e., judges whether the priority level of the client that requests for access is higher than the priority level of the current user. If the priority level of the client is lower than or equal to the priority level of the current user, the streaming media server executes step 414; otherwise it executes step 415.

Step 414: The streaming media server returns a failure message to the client.

Step 415: If the priority level of the client is higher than the priority level of the current user, the electronic device resource occupied by the current user is freed.

Step 416: The streaming media server sends the electronic device control information to the electronic device, so as to control the activities of the electronic device.

Through above steps, the authentication for the client to use the electronic device is accomplished, and the electronic device can be controlled from the client. It is seen from above description that the present invention has the following technical benefits.

1. Compared with a professional method for controlling the camera in the prior art, the present invention can implement control of the electronic device (e.g., camera) from the client as well as control of the electronic device in the streaming media playback process. This has never been achieved before.

2. By extending or defining the Method, header field, message body in the network control protocol (e.g., RTSP), or a combo of any combination of the Method, header field, and message body with the widely used streaming techniques, the electronic devices (e.g., camera and assistant equipment) can be controlled conveniently and easily from the client in the streaming media playback process.

The embodiment of the present invention can be implemented by sending electronic device operating instructions and operating parameters from the client to the streaming media server. The parameters can be transmitted in an existing network control protocol, such as SIP, RTSP, or HTTP. In the embodiments of the present invention, the function is implemented in RTSP; however, that function can also be implemented in SIP or HTTP, or other protocols in a similar way, because these protocols are similar to RTSP in syntax, result, and function.

In the embodiments of the present invention, by extending and modifying RTSP, the revolution of the camera can be controlled easily; the revolution control covers control of camera revolution direction, angle, speed, and pan; and control of camera lens, including lens zoom can also be controlled conveniently. The camera control capability can enhance the user's autonomy and enrich the user's experience in the streaming media playback process.

3. The conflict in resource use and the security problem in the streaming media electronic device control process can be solved by adding security control strategy to RTSP, including user identity authentication and access right control. As a result, the convenience and security in electronic device control can be improved greatly.

4. Because the HTTP streaming media server for electronic device control and authentication in the prior art can be omitted, the cost is reduced.

To help those skilled in the art understand the present invention better, hereunder the implementation of the electronic device control function and authentication function will be described taking a camera and assistant equipment as an example.

Embodiment 1

Figure 5:
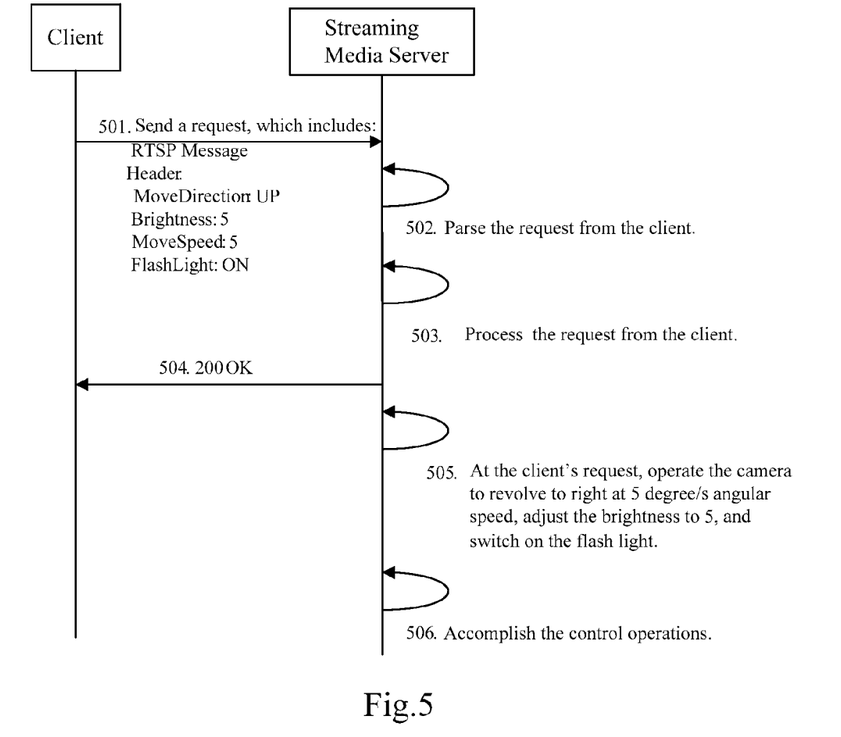
FIG. 5 shows a timing sequence diagram of an authentication method for controlled electronic device resources according to an embodiment of the present invention.

FIG. 5 shows a timing sequence diagram of a method for controlling the electronic device resources according to an embodiment of the present invention. The task is: Controlling the camera with the extended ACTION method and header fields described in the present invention to tilt up at 5 degree/s angular speed, switching on the assistant light source, and adjusting the brightness to 5. In addition, in order to accomplish the user identity authentication process, the IMSI information is to be carried in the RTSP message. The process is as follows.

Step 501: The client sends a request to the streaming media server; the request indicates: tilting up the camera at 5 degree/s angular speed, switching on the assistant light source, and adjusting the brightness to 5. The format is as follows.

ACTION RTSP://www.sample.com/sample RTSP/1.0
CSeq: 1
Session: 12345678
MoveDirection: UP
MoveSpeed: 5
AssistantLight: ON
Brightness: 5
IMSI: 4601123456

Step 502: The streaming media server parses the request from the client, to obtain the indication information in the request, i.e., tilting up the camera at 5 degree/s angular speed, switching on the assistant light source, and adjusting the brightness to 5.

Step 503: The streaming media server processes the request from the client.

Step 504: The streaming media server returns a success response message (i.e., 200 OK) to the client.

Step 505: According to the request from the client, the camera is controlled to tilt up at 5 degree/s angular speed, the brightness is adjusted to 5, and the flash light is switched on.

Step 506: The streaming media server accomplishes the control operation.

Embodiment 2

The extended ACTION method and message body described in the present invention are utilized to control the camera to revolve towards right at 5 degree/s angular speed, switch on the assistant light source, and adjust the brightness to 5. In addition, the client shall be authenticated. In order to accomplish the user identity authentication process, the IMSI information should be carried in the RTSP message.

```
ACTION RTSP://www.sample.com/sample RTSP/1.0
<Note : Extended ACTION method>
CSeq : 1
Session : 12345678
Content-Type: application/cameraAction + xml
<Note : Extended message body content, which is used to enable the
streaming media server and the client to know the structure of the
message body.>
Content-Length : 121
IMSI : 4601123456
<Note: The IMSI information is carried in the RTSP message.>
<?xml version="1.0" encoding="GB2312" ?>
<RTSP_CameraAction>
<!--Note : Action of the camera-->
  <CameraActionRequest>
    <!--Note : Camera action request-->
    <CameraAction>
    <!--Note : description of camera action-->
      <MoveDirection = "UP" />
      <!--Note: Move direction, up-->
      <MoveSpeed = "5" />
      <!--Note: Move speed, 5 degree/s-->
    <CameraAction/>
    <Lens>
      <Brightness = "5" />
      <!--Note: Lens operation-->
    <Lens/>
      <!--Note: Lens brightness to 5-->
    <AssistantEquipment> : Assistant equipment operation
      <FlashLight = "ON" /> : Switch on the flash light
```

```
    <AssistantEquipment/>
    <CameraActionRequest/>
<RTSP_CameraAction/> : extended message body
<Note : extended ACTION method>
CSeq : 1
Session : 12345678
Content-Type: application/cameraAction + xml
<Note: Extended message body content, which is used to enable the
streaming media server and the client to know the structure of the
message body.>
Content-Length : 121
IMSI : 4601123456
<Note: The IMSI information is carried in the RTSP message.>
<?xml version="1.0" encoding="GB2312" ?>
<RTSP_CameraAction>
  <!--Note: Camera action-->
    <CameraActionRequest>
      <!--Note: Camera action request-->
        <CameraAction>
          <!--Note: Description of camera action-->
            <MoveDirection = "UP" />
            <!--Note: Move direction, up-->
            <MoveSpeed = "5" />
            <!--Note: Move speed, 5 degree/s-->
        <CameraAction/>
        <Lens>
          <!--Note: Lens operation-->
            <Brightness = "5" />
            <!--Note: Lens brightness, 5-->
        <Lens/>
        <AssistantEquipment>
          <!--Note: Assistant equipment operation-->
            <FlashLight = "ON" />
            <!--Note: Switch on the flash light-->
        <AssistantEquipment/>
      <CameraActionRequest/>
<RTSP_CameraAction/>
<!--Note: Extended message body-->
```

When receiving the RTSP message, the streaming media server carries out authentication, and operates the camera as requested in the RTSP message in accordance with the authentication result. That is to say, when the streaming media server receives and parses the authentication information from the electronic device, it will carry out authentication according to the authentication information, and control the electronic device according to the control information after the authentication is passed. The specific implementation procedures are similar to those in embodiment 1, and therefore will not be further described here.

Embodiment 3

The extended ACTION Method, header field, and message body described in the present invention are utilized to control the camera to revolve towards right at 5 degree/s angular speed, switch on the assistant light source, and adjust the brightness to 5. In addition, in order to accomplish the user identity authentication process, the IMSI information is carried in the RTSP message.

```
ACTION RTSP://www.sample.com/sample RTSP/1.0
CSeq : 1
Session : 12345678
Content-Type: application/cameraAction + xml
Content-Length : 121
IMSI : 4601123456
CameraScan : OFF
CameraSwitch : ON
<?xml version="1.0" encoding="GB2312" ?>
<RTSP_CameraAction>
  <CameraActionRequest>
```

```
    <CameraAction>
      <MoveDirection = "UP" />
      <MoveSpeed = "5" />
    <CameraAction/>
    <Lens>
      <Brightness = "5" />
    <Lens/>
    <AssistantEquipment>
      <FlashLight = "ON" />
    <AssistantEquipment/>
  <CameraActionRequest/>
<RTSP_CameraAction/>
```

When receiving the RTSP message, the streaming media server carries out authentication, and operates the camera as requested in the RTSP message in accordance with the authentication result.

Embodiment 4

The method in any of above three embodiments can also employ the PLAY method in RTSP protocol. The process as shown in embodiment 3 can also be represented as:

```
PLAY RTSP://www.sample.com/sample RTSP/1.0
CSeq : 1
Session : 12345678
Content-Type: application/cameraAction + xml
Content-Length : 121
IMSI : 4601123456
CameraScan : OFF
CameraSwitch : ON
<?xml version="1.0" encoding="GB2312" ?>
<RTSP_CameraAction>
  <CameraActionRequest>
    <CameraAction>
      <MoveDirection = "UP" />
      <MoveSpeed = "5" />
    <CameraAction/>
    <Lens>
      <Brightness = "5" />
    <Lens/>
    <AssistantEquipment>
      <FlashLight = "ON" />
    <AssistantEquipment/>
  <CameraActionRequest/>
<RTSP_CameraAction/>
```

When receiving the RTSP message, the streaming media server carries out the authentication, and operates the camera as requested in the RTSP message in accordance with the authentication result.

Embodiment 5

Suppose a user of a low priority level with IMSI=4601000001 is controlling the camera, and if a user with IMSI=4601123456 wants to control the camera, he/she will initiate a request to the streaming media server as follows:

```
ACTION RTSP://www.sample.com/sample RTSP/1.0
CSeq : 1
Session : 12345678
Content-Type: application/cameraAction + xml
Content-Length : 121
IMSI : 4601123456
CameraScan : OFF
CameraSwitch : ON
FreeCamera : ON
```

-continued

```
<?xml version="1.0" encoding="GB2312" ?>
<RTSP_CameraAction>
    <CameraActionRequest>
        <CameraAction>
            <MoveDirection = "UP" />
            <MoveSpeed = "5" />
        <CameraAction/>
        <Lens>
            <Brightness = "5" />
        <Lens/>
        <AssistantEquipment>
            <FlashLight = "ON" />
        <AssistantEquipment/>
    <CameraActionRequest/>
<RTSP_CameraAction/>
```

After the streaming media server accomplishes the authentication process and obtains the access right information of the user, it will choose to free the resources occupied by the current user in accordance with the FreeCamera: ON parameter information. As the result, the user with IMSI=4601123456 obtains the right to control the camera.

In addition, an embodiment of the present invention further provides a streaming media server, including: an information parsing unit, adapted to parse the received client message, i.e., parse out the electronic device control information from the initial line, header field, message body in the network control protocol, or a combo including any combination of the initial line, header field, and message body in the message containing the control information for the controlled electronic device. The streaming media server further includes an executing unit or information transmitting unit. The executing unit is adapted to execute corresponding actions in accordance with the control information. The information transmitting unit is adapted to transmit the control information to the electronic device.

Because an information parsing unit and an executing unit/information transmitting unit are used, the message containing the electronic device control information from the client can be parsed, and especially, the electronic device control information included in the initial line, header field, message body in the network control protocol, or the combo including any combination of the initial line, header field, and message body can be parsed with streaming media techniques. Only with an off-the-shelf standardized streaming media system, the electronic device can be controlled via the executing unit of the streaming media server conveniently, or by transmitting the control information to the electronic device via the information transmitting unit, the electronic device can be controlled by itself, without the need for any professional electronic device control system.

Figure 6:
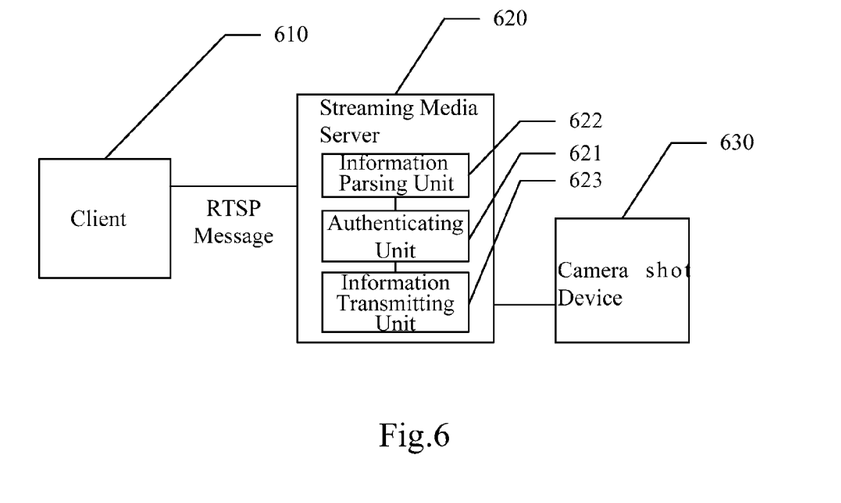
FIG. 6 shows a structural diagram of a streaming media server that controls an electronic device according to an embodiment of the present invention.

FIG. 6 shows a structural diagram of a streaming media server controlling a camera according to an embodiment of the present invention. The streaming media server 620 includes an authenticating unit 621, an information parsing unit 622, and an information transmitting unit 623.

The information parsing unit 622 is adapted to parse the RTSP message received from the client 610. The message contains camera control information and client authentication information. The control information and/or authentication information is included in the initial line, header field, message body of the RTSP message, or a combo including any combination of the initial line, header field, and message body.

Specifically, the authentication information includes: identity authentication information and access right control information in the extended header field IMSI; or identity authentication information and access right control information in the extended header field MSISDN; or identity authentication information and access right control information in the extended header fields IMSI and MSISDN; or identity authentication information in the extended header field IMSI; or identity authentication information in the extended header field MSISDN.

The authenticating unit 621 is adapted to compare the authentication information parsed out by the information parsing unit 622 with the corresponding authentication information stored in the streaming media server 620, so as to authenticate whether the client has the right to access the camera. If the comparison result indicates the client does not have the right to control the camera and other assistant equipment or watch the streaming media content, the authenticating unit 621 instructs the streaming media server 620 to return a failure message to the client; otherwise it instructs the streaming media server 620 to return a success message to the client.

The authenticating unit 621 further authenticates the relationship between the priority level of the client who wants to access the camera and the priority level of any user who is accessing the camera. If the priority level of the client who wants to access the camera is higher than the priority level of the user who is accessing the camera, the authenticating unit 621 instructs the streaming media server 620 to release the connection between the camera and the user who is accessing the camera.

The information transmitting unit 623 is adapted to forward the camera control information parsed out by the control information parsing unit 622 to the camera, so as to control the camera shot device 630 from the client.

The protocol control method is the RTSP PLAY method or extended ACTION method; the message body is of an RTSP MIME type named as application/cameraAction+xml; the control information is encapsulated in xml of the MIME type.

In this embodiment, a streaming media server including the information transmitting unit is taken as an example. In other embodiments, an executing unit may be used. The difference lies in: if an executing unit is used, the control information parsed out by the control information parsing unit will be directly converted into the machine language to control the electronic device directly.

In addition, an embodiment of the present invention further provides a streaming media server, including: a receiving unit, a parsing unit, and a control unit. Preferably, the streaming media server further includes an authenticating unit. The receiving unit is adapted to receive the electronic device control information sent from the client, and the control information is included in the initial line, header field, message body in the network control protocol, or a combo including any combination of the initial line, header field, and message body. The parsing unit is adapted to parse out the electronic device control information from the initial line, header field, message body in the network control protocol, or the combo including any combination of the initial line, header field, and message body. The control unit is adapted to control the electronic device according to the control information. The authenticating unit is adapted to authenticate the client according to the authentication information and send the client authentication result to the control unit, and the authentication information is received by the receiving unit and parsed by the parsing unit.

Preferably, the electronic device is a camera shot device including a camera, a lens, and assistant equipment. The control information includes at least any of the following information: information for controlling actions of the camera shot device, actions of the lens, and actions of the assistant equipment.

The functions and purposes of the units and sub-units in the streaming media server in the embodiment are identical to those in the fore-mentioned embodiments, and therefore will not be described further.

Preferably, the authenticating unit includes:

a first judging sub-unit, adapted to judge whether the identity authentication information contained in the MSISDN information matches the authentication information stored locally and send the judgment result, after it receives the MSISDN information;

a second judging sub-unit, adapted to judge whether the client has the right to control the electronic device or watch the streaming media content and send the judgment result, after it receives the judgment result indicating mismatch from the first judging unit; and a first feedback sub-unit, adapted to send a success or failure message to the client, after it receives the judgment result from the second judging unit.

Preferably, if the identity authentication information includes user access priority level information, the authenticating unit further includes:

a third judging sub-unit, adapted to judge whether the controlled electronic device resource is available and send the judgment result, after it receives the judgment result indicating match from the first judging unit;

a second feedback sub-unit, adapted to send a success message to the client, after it receives the judgment result indicating the resource is available from the third judging sub-unit;

a comparing sub-unit, adapted to compare the priority level information of the current user with the priority level information contained in the identity authentication information, when it receives the judgment result indicating the resource is unavailable from the third judging sub-unit and the controlled electronic device resource is being used by a user; and a freeing sub-unit, adapted to free the electronic device resource currently used by the user, when it receives the comparison result indicating the user priority level contained in the identity authentication information is higher than the priority level of the current user from the comparing sub-unit.

The functions and purposes of the units and sub-units in the streaming media server are identical to those in the fore-mentioned embodiments, and therefore will not be described further.

In addition, an embodiment of the present invention further provides a streaming media server, including: a receiving unit, a parsing unit, and an authentication judging unit. Preferably, the streaming media server further includes a control unit. The receiving unit is adapted to receive the client authentication information from the client, and the client authentication information is included in the initial line, header field, message body in the network control protocol, or a combo including the initial line, header field, and message body. The parsing unit is adapted to parse out the client authentication information from the initial line, header field, message body in the network control protocol, or the combo including the initial line, header field, and message body. The authenticating unit is adapted to authenticate the client according to the authentication information. The control unit is adapted to control the electronic device according to the control information after it receives the authentication result indicating the client has passed the authentication from the authenticating unit, and the control information is received by the receiving unit and parsed by the parsing unit.

Preferably, the authenticating unit may further include: a first judging sub-unit, a second judging sub-unit, and a first feedback sub-unit. The sub-units are identical to those described above in functionality and purpose, and therefore will not be described further here.

Preferably, if the identity authentication information includes user priority level information, the authenticating unit further includes: a third judging sub-unit, a second feedback sub-unit, a comparing sub-unit, and a freeing sub-unit. These sub-units are identical to those described above in functionality and purpose, and therefore will not be described further here.

While the present invention has been illustrated and described with reference to some preferred embodiments, the present invention is not limited to these. Those skilled in the art should recognize that various variations and modifications can be made without departing from the spirit and scope of the present invention as defined by the accompanying claims.

The invention claimed is:

1. An authentication method for a controlled electronic device resource, wherein the controlled electronic device resource is stored on an electronic device, the authentication method comprising:

obtaining, by a client, International Mobile Subscriber Identity (IMSI) information, and including, by the client, the IMSI information into an initial line, a header field, or a message body of a network control protocol, or a combination comprising any one or more of the initial line, the header field, and the message body, and transmitting, by the client, the IMSI information to a Real-Time Streaming Protocol (RTSP) proxy through an access network and a core network;

obtaining, by the RTSP proxy, Mobile Station International Integrated Services Digital Network Number (MSISDN) information corresponding to the IMSI information from a Home Location Register (HLR), and including, by the RTSP proxy, the MSISDN information into an initial line, a header field, or a message body of RTSP, or a combination comprising any one or more of the initial line, the header field, and the message body, and sending, by the RTSP proxy, the MSISDN information, after the RTSP proxy receives the IMSI information, wherein the MSISDN information further comprises at least identity authentication information and access right control information;

receiving, by a streaming media server, the MSISDN information included in the initial line, the header field, or the message body of the RTSP, or the combination comprising any one or more of the initial line, the header field, and the message body of the RTSP;

parsing out, by the streaming media server, the MSISDN information from the initial line, the header field, or the message body of the RTSP, or the combination comprising any one or more of the initial line, the header field, and the message body of the RTSP, wherein the identity authentication information contained in the MSISDN information comprises user priority level information;

judging, by the streaming media server, that a client does not have a right to control the electronic device or watch streaming media content, and returning, by the streaming media server, a failure message when the identity authentication information contained in the MSISDN information does not match authentication information pre-stored in the streaming media server;

judging, by the streaming media server, whether the controlled electronic device resource is available when the identity authentication information contained in the MSISDN information matches the authentication information pre-stored in the streaming media server;

returning, by the streaming media server, a success message to the client when the controlled electronic resource is available;

comparing, by the streaming media server, the priority level of the current user with the user priority level contained in the identity authentication information when the controlled electronic device resource is not available, and the controlled electronic device resource is being used by a user; and freeing, by the streaming media server, the controlled electronic device resource used by the current user when the user priority level contained in the identity authentication information is higher than the priority level of the current user.

2. A streaming media server, comprising:

a receiver, configured to receive Mobile Station International Integrated Services Digital Network Number (MSISDN) information from a client through a Real-Time Streaming Protocol (RTSP) proxy, wherein the MSISDN information is obtained by:

obtaining, by the client, International Mobile Subscriber Identity (IMSI) information, and including, by the client, the IMSI information into an initial line, a header field, or a message body of a network control protocol or a combination comprising any one or more of the initial line, the header field, and the message body;

transmitting, by the client, the IMSI information to the RTSP proxy through an access network and a core network;

obtaining, by the RTSP proxy, the MSISDN information corresponding to the IMSI information from a Home Location Register, and including, by the RTSP proxy, the MSISDN information into an initial line, a header field, or a message body of RTSP or a combination comprising any one or more of the initial line, the header field, and the message body; and sending, by the RTSP proxy, the MSISDN information by the RTSP proxy, after the RTSP proxy receives the IMSI information, wherein the MSISDN information comprises at least the identity authentication information and access right control information;

a processor, configured to parse out the MSISDN information from the initial line, the header field, or the message body, or the combination comprising any one or more of the initial line, the header field, and the message body and authenticate the client according to the identity authentication information contained in the MSISDN information, wherein the identity authentication information contained in the MSISDN information comprises user priority level information, and wherein the processor is configured to:

judge that the client does not have a right to control an electronic device or watch streaming media content and generate a failure message when the identity authentication information contained in the MSISDN information does not match authentication information pre-stored in the streaming media server;

judge whether the controlled electronic device resource that is stored on the electronic device is available when the identity authentication contained in the MSISDN information matches authentication information pre-stored in the streaming media server;

generate a success message when the controlled electronic device resource is available;

compare the priority level of the current user with the user priority level contained in the identity authentication information when the controlled electronic device resource is not available and the controlled electronic device resource is being used by a user; and free the controlled electronic device resource used by the current user when the user priority level contained in the identity authentication information is higher than the priority level of the current user; and a transmitter configured to send the success message or the failure message to the client.

3. The streaming media server according to claim 2, wherein the streaming media server further comprises a controller configured to control the electronic device with control information after the controller receives an authentication result indicating the client has passed authentication from the processor, wherein the control information is received by the receiver and parsed by the processor.

* * * * *